United States Patent [19]
Ung

[11] Patent Number: 5,749,630
[45] Date of Patent: May 12, 1998

[54] GRAVITY UNLOADING MECHANISM

[76] Inventor: Lu-Hsiung Ung, Fl. 2, No. 5, Lane 3, Hsing Tong Street, Taipei, Taiwan

[21] Appl. No.: 660,394

[22] Filed: Jun. 7, 1996

[51] Int. Cl.$^6$ ...................................................... B60P 1/34
[52] U.S. Cl. .......................... 298/18; 414/470; 105/260; 298/1 B
[58] Field of Search .............................. 298/1 B, 18, 23 F, 298/23 DF; 105/255, 260; 414/470

[56] References Cited

U.S. PATENT DOCUMENTS

| | | | |
|---|---|---|---|
| 1,067,074 | 7/1913 | Strellner et al. | 105/260 |
| 1,383,288 | 7/1921 | Campbell | 105/255 |
| 4,106,812 | 8/1978 | Clark | 414/470 |

FOREIGN PATENT DOCUMENTS

| | | | |
|---|---|---|---|
| 1405200 | 8/1964 | France | 105/260 |
| 531425 | 7/1931 | Germany | 105/260 |
| 2236152 | 4/1991 | United Kingdom | 414/470 |

Primary Examiner—Karen B. Merritt
Assistant Examiner—Gregory A. Morse
Attorney, Agent, or Firm—Bucknam and Archer

[57] ABSTRACT

A gravity unloading method for cargo box having split bottom plates. A pair of rectangular split bottom plates abut at one of the long sides of the bottom plates and pivoted near the other of the long sides thereof on the bottom of the cargo box. Force is applied by power devices beneath the bottom plate, causing the split bottom plates to turn pivotally and become inclined. A side plate is disposed vertically at the edge of each of the long sides of the bottom plate. The ends of the side plates adjacent the bottom plate can be pivotally turned open through the free ends turning up by a linkage such that the articles located on the split bottom plates can completely slide out by their own weight from both sides.

9 Claims, 7 Drawing Sheets

GRAVITY UNLOADING MECHANISM

The present invention relates to a new innovative method for unloading articles from a cargo box and, in particular, to such an unloading method in which force is applied on the split bottom plates of a cargo box, causing them to become inclined, and the side plates of the cargo box are opened at the same time by cables linked thereto such that articles placed on the bottom plates can slide down by their own weight. The present invention further relates to the mechanism for carrying out such unloading method.

It is known that with conventional ramp unloading from a cargo box, for example, the cargo box of a truck, force is applied on the bottom of the cargo box by a relatively complicated hydraulic device located under the cargo box, the front end of the cargo box being raised to become inclined rearwardly for more than 55 degrees such that the articles in the cargo box slide down by their own weight. In such cargo box lifting structures, the distance between the point of force application and the fulcrum corresponds to the longitudinal length of the cargo box. Therefore, the cargo box must be inclined to some extent and an equivalent force must be applied, causing the articles in the cargo box to have the tendency to slide out from the cargo box.

The unloading method for cargo box having split bottom plates provided by the present invention is different from said conventional unloading methods. In the present invention, the bottom plate of the cargo box is comprised of a pair of split plates. A small lifting force is applied at the interface between the split plates, causing the split bottom plates each to become inclined about the other side. At the same time, the inclining movement of the split plates is linked to the side plates on both sides of the cargo box, causing them to be opened into a slide-out opening for the articles.

Accordingly, an object of the present invention is to provide a method of unloading articles from a cargo box having split bottom plates wherein the split bottom plates are raised by applying force at the interface there between, thus causing to rotate about respective fulcrums such that the split bottom plates are inclined to form into the shape of a chevron. At the same time, the split bottom plates each actuate a cable to pivotally turn the two side plates and form an opening at the side edges of the split bottom plates. Therefore, with the present invention, it is not necessary to raise the split bottom plates excessively to effect automatic unloading from the cargo box by using the longitudinal sides of the split bottom plates as the axis of rotation.

Another object of the present invention is to provide an unloading method with which articles can be unloaded from both sides and the split bottom plates of the cargo box are inclined at a height much smaller than conventional cargo box having the entire bottom plate turning pivotally widthwise. Therefore, the method of the present invention can be used for unloading articles from truck and train cargo boxes.

A further object of the present invention is to provide an unloading method which, by having the rotation of the split bottom plates of the cargo box linked to the two side plates for the plates to open synchronously, can be used on automated controlled unloading operation basis.

A still further object of the present invention is to provide an automatic unloading mechanism for the cargo box having split bottom plates. Said mechanism comprises a pair of split bottom plates arranged side by side, force being applied on the adjacent ends thereof by power devices, and the ends distant relative to each other being pivoted on a base for swinging movement; a left and a right side plates disposed vertically on the edges of the distant ends of the split bottom plates, the top ends being pivoted such that the side pates can swing so as to surround a cargo box together with the split bottom plates; and a pair of cables, one end of each of the cables being secured to the bottom face of the adjacent end of a corresponding split bottom plate, the other end thereof passing through the bottom face of respective split bottom plate, turning around the other end edge of the split bottom plates, and after passing around the top edge of the side plate, extending down vertically along the outer end of the side plate to be secured beneath the side plate. As a result, when the power devices actuate the split bottom plates to go up, the split bottom plates can turn pivotally about respective axis of rotation and become inclined to form into the shape of a chevron. At the same time, during swinging movement of the split bottom plates, the cables secured thereto pull the two side plates simultaneously, causing them to turn open around the axis such that the articles in the cargo box are free to slide out more thoroughly from the opening of the side plates by their own weight.

A still another object of the present invention is to provide a cargo box unloading mechanism wherein the lifting power for the split bottom plates can be separately supplied by a plurality of small power devices having relatively short strokes so as to avoid requiring power devices of particular specifications with high power ratings and for easy effort-saving routine maintenances and replacements.

A still further object of the present invention is to provide a cargo box unloading mechanism wherein the vertical side plates on both sides can be disengaged from the front and rear end plates and stacked on the bottom plate such that the cargo box can be converted for carrying other articles such as a container. Alternatively, after the container has been placed on the bottom plate, the side plates can be placed on top of or under the container such that the vehicle may carry other articles or container on its return trip so as to increase its capacity and to achieve faster arrangement for train and truck transportation for computerized operation.

The present invention will be better understood from the following detailed description of preferred embodiments thereof taken in conjunction with the accompanying drawings wherein.

Figure 1:
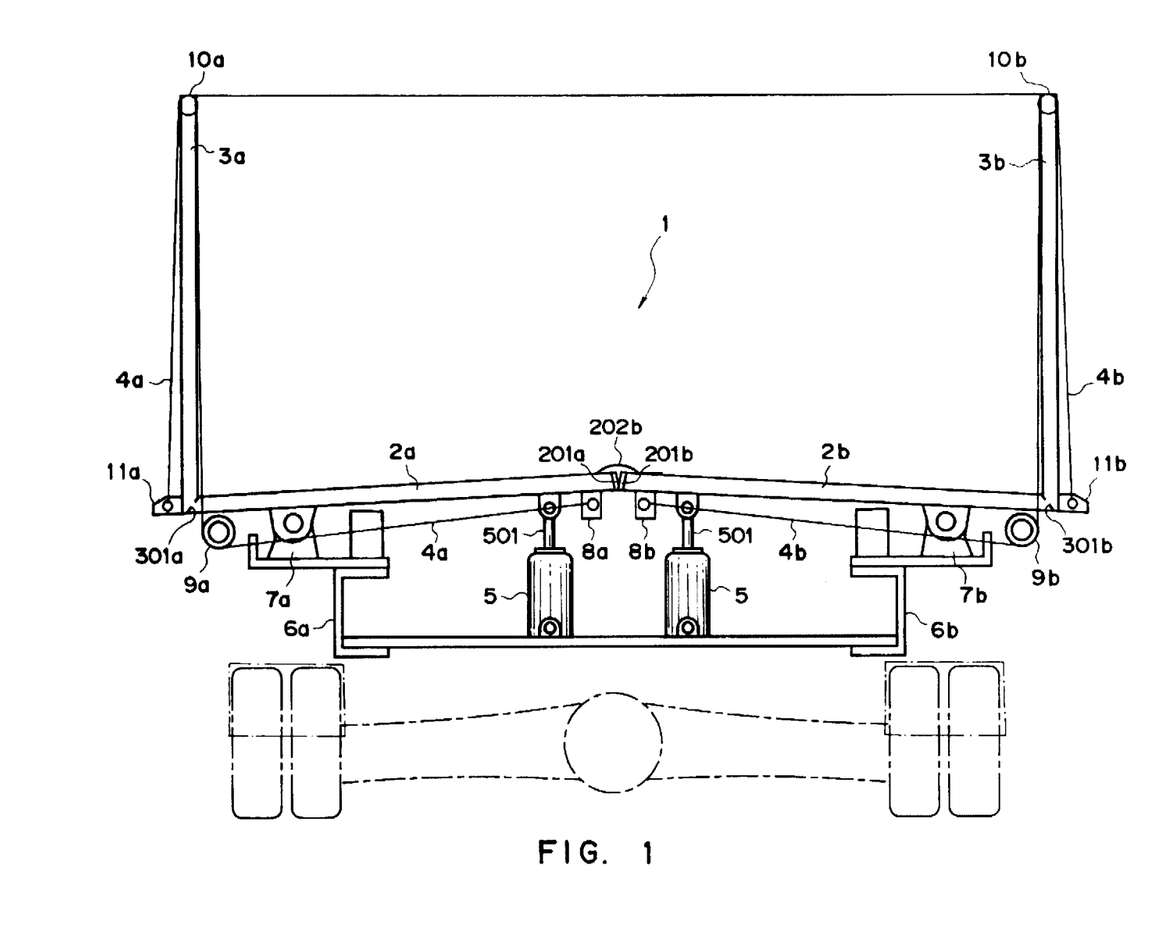
FIG. 1 is a schematic cross section view of the cargo box having split bottom plates of the present invention as installed on a truck chassis.

Referring first to FIG. 1, the cargo box 1 of the split bottom plates of the present invention comprises a pair of rectangular split bottom plates 2a, 2b, a pair of vertical side plates 3a, 3b, linkage cables 4a, 4b; and a plurality of power devices, represented by hydraulic cylinders 5 in the embodiment, located on the two sides of the interface of the split bottom plates. The split bottom plates 2a, 2b, after being assembled, serve as the portion of the cargo box 1 for carrying articles. The undersides of the split bottom plates 2a, 2b are pivoted longitudinally at the distant ends to bearing mounts 7a, 7b fixed on the truck main frames 6a, 6b such that they have the tendency to rotate. The adjacent ends of the split bottom plates 2a, 2b are fixed with anchoring posts 8a, 8b at the positions along the two longitudinal ends of the bottom for securing one end of each of the cables 4a, 4b. In addition, a pair of resilient padding strips 201a, 201b are secured to the adjacent ends of the split bottom plates along the end edges and a longitudinal seaming strip 202b for masking the seam is secured over the end edge of one of the split bottom plates, such as the split bottom plate 2b. The hydraulic cylinders 5 are installed under the split bottom plates 2a, 2b longitudinally of the cargo box and piston rods 501 are pivoted to the split bottom plates 2a, 2b.

A pair of vertical side plates 3a, 3b are pivoted at the top ends thereof, the portions of the lower end edges abutting the split bottom plates are beveled into slant surfaces 301a, 301b, the end edges of the split bottom plates at this position being also formed into slant surfaces such that the surfaces mate with each other. One end of each of the cables 4a, 4b is secured, respectively, to the anchoring posts 8a, 8b in front of the undersides of the split bottom plates 2a, 2b, the other end thereof extending along the undersides of the split bottom plates 2a, 2b to the other end passing through pulleys 9a, 9b turning up vertically and around the pulleys 10a, 10b on the top end of the side plates to extend down along the outer sides of the side plates 3a, 3b, and then turning down until finally secured to the anchoring posts 11a, 11b at the lower end edges of the side plates 3a, 3b.

Figure 3:
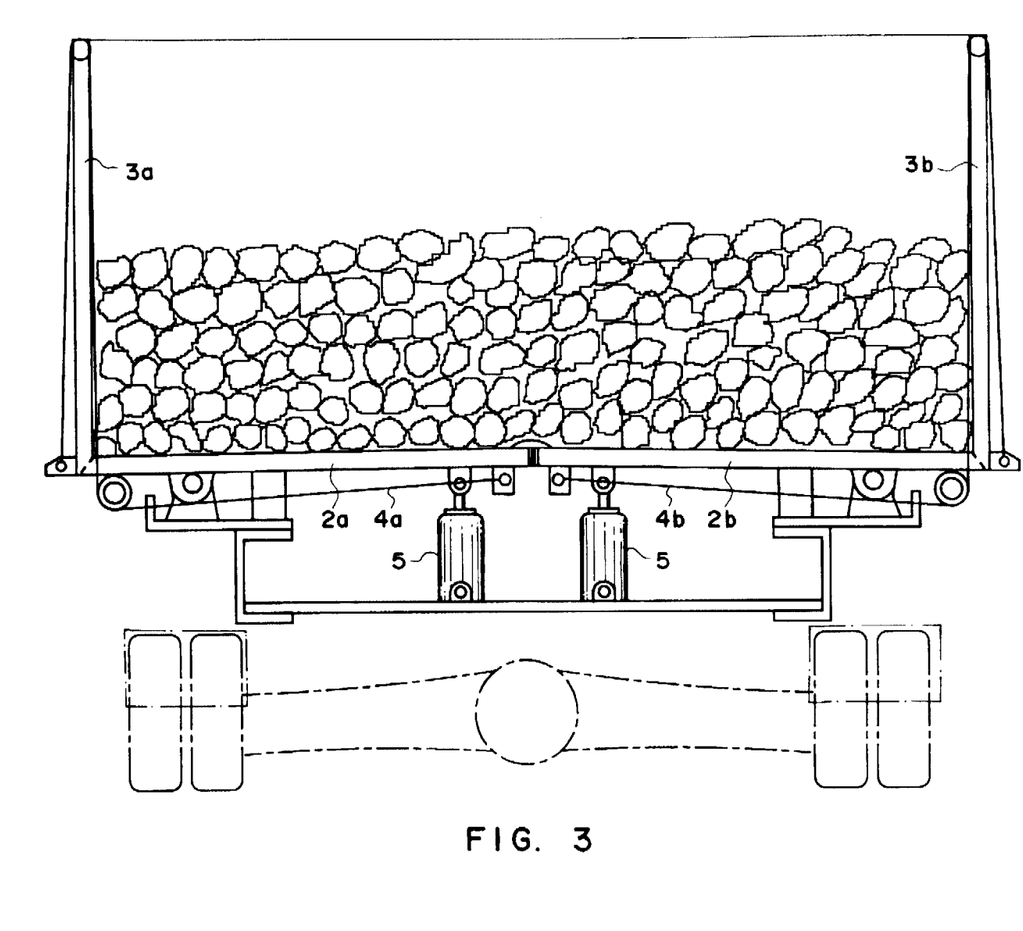
FIG. 3 shows the cargo box structure of the present invention as shown in FIG. 1 when used for loading articles.

According to the present invention, when no articles are loaded, the adjacent ends of the split bottom plates 2a, 2b abut against each other in a slightly inclined condition. When loaded with articles, the split bottom plates 2a, 2b are pressed into a horizontal condition as shown in FIG. 3. Conventional automatic or manual locking means can be installed at the lower end portions of the side plates 3a, 3b, and between the split bottom plates, preferably marked with different colors for easy recognition by an operator so as to ensure that the side plates 3a, 3b, will not be inadvertently turned apart from the split bottom plates during transportation.

Figure 4:
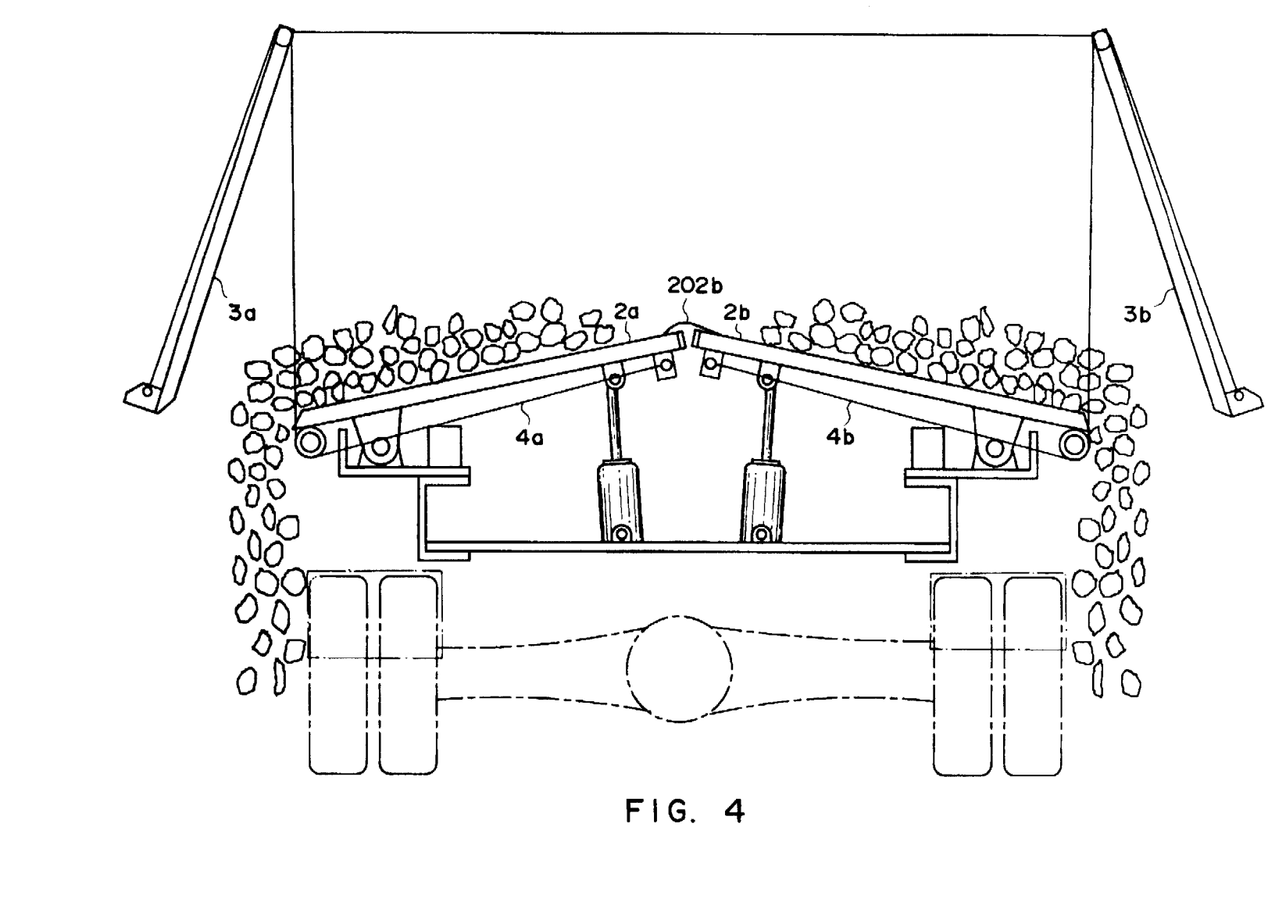
FIG. 4 shows the cargo box structure of the present invention when used for unloading articles.

When it is desired to unload the articles in the cargo box, the first step is to unlock the side plates and the split bottom plates if they are locked. Then, the hydraulic cylinders 5 are actuated to lift the piston rods 501 up. As shown in FIG. 4, the split bottom plates 2a, 2b turn pivotally and gradually become inclined. During the inclining process, the cables 4a, 4b fixed to the front ends of the split bottom plates are raised up therewith such that the other ends of the cables 4a, 4b are pulled, causing the side plates 3a, 3b secured to those other ends to turn open around the axis on the top end, and the articles in the cargo box start to slide down by their own weight. As the piston rods 501 keep rising up, the split bottom plates 2a, 2b become inclined to a greater degree, and the articles are discharged at increased speeds until all the articles are unloaded. Thereafter, the piston rods 501 are reversely actuated to be retracted, causing the split bottom plates 2a, 2b to restore to their initial positions as shown in FIG. 1.

Figure 2:
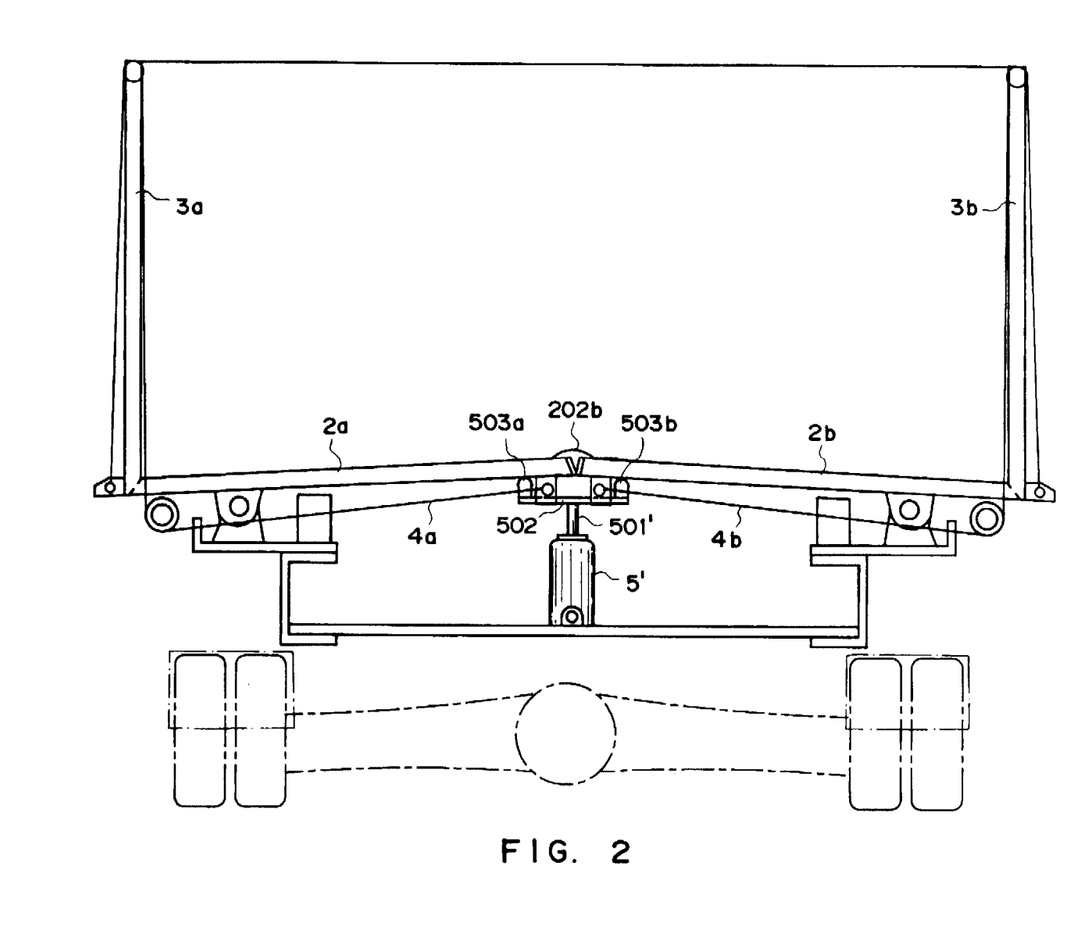
FIG. 2 shows the same structure of the cargo box as that shown in FIG. 1 except for the difference that the split bottom plates are actuated simultaneously by a row of hydraulic cylinders.

FIG. 2 shows another manner in which the hydraulic cylinders are arranged, the difference with FIG. 1 lying in that only one row of hydraulic cylinders 5' are used to substitute two rows of hydraulic cylinders. In the case where one row of hydraulic cylinders 5' are used, the hydraulic cylinders are provided on the line of interface aligned with the split bottom plates, and a force dividing plate 502 is secured to the piston rods 501', both sides thereof extending, respectively, to below the split bottom plates 2a, 2b, and arcuate projected posts 503a, 503b being formed on both ends of the force dividing plate. Thus, when the piston rods 501' are raised up, arcuate projected posts 503a, 503b push individually one end of each of the split bottom plates 2a, 2b, causing them to become inclined for unloading the articles. The process is the same as that shown in FIG. 4 and hence not repeatedly described herein.

Figure 5:
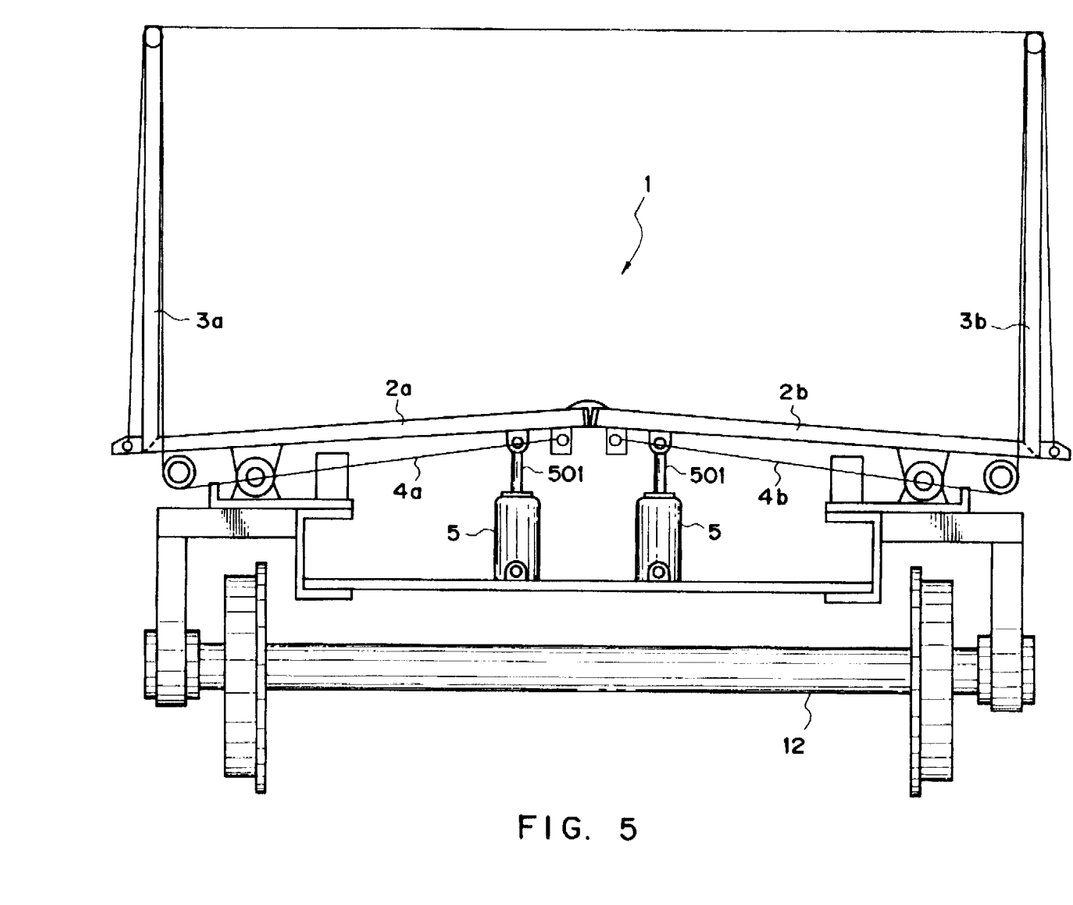
FIG. 5 is a schematic cross section view of the cargo box having split bottom plates of the present invention as installed on the flat bed of a train.

FIG. 5 shows that the cargo box 1 is installed on a flat bed train 12. It is to be stressed that with the present invention, the bottom plates of the cargo box of the train can be inclined toward the sides for unloading the articles by gravity, which is done more thoroughly using less effort than as done conventionally.

Figure 6:
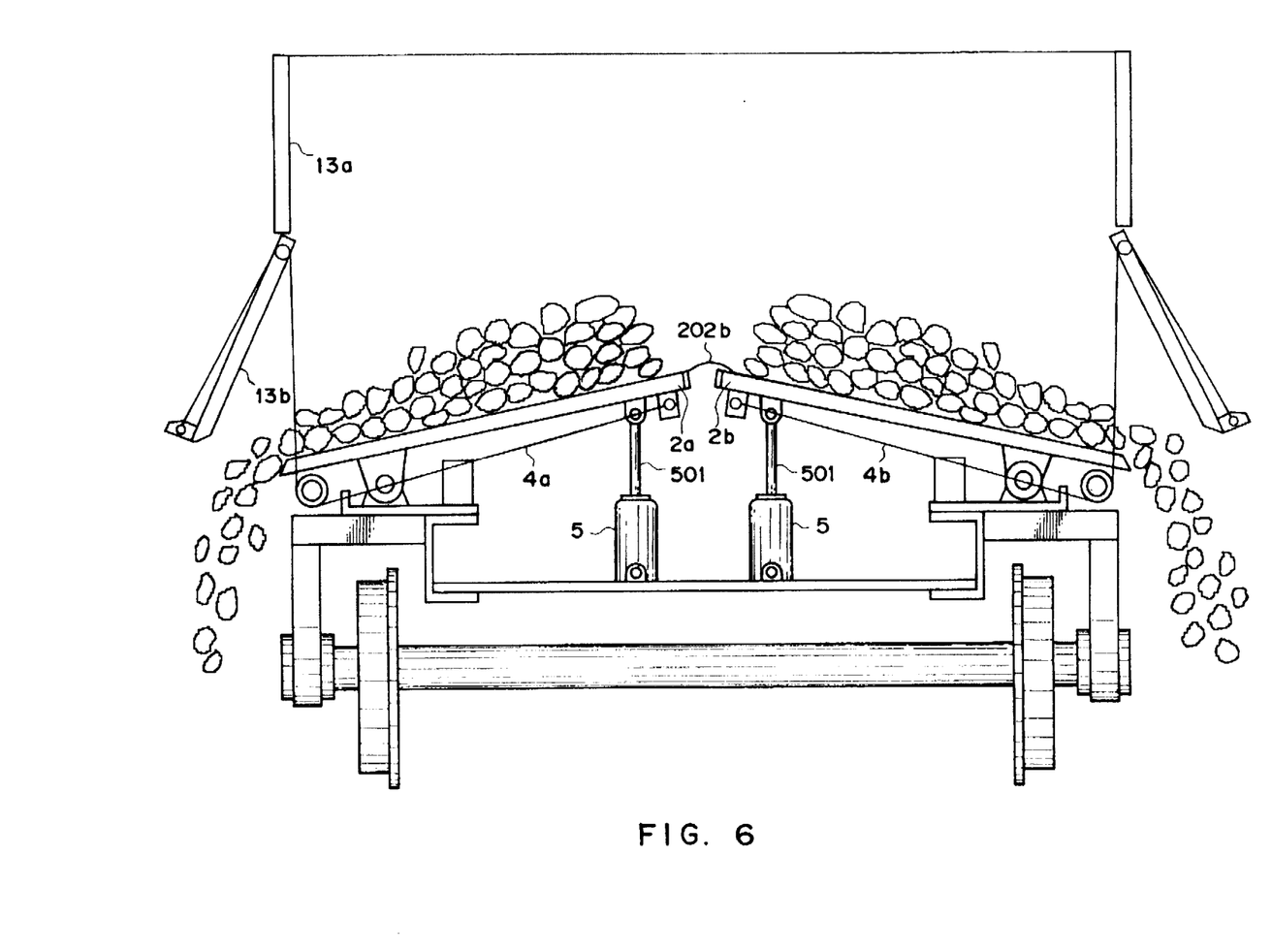
FIG. 6 shows another embodiment of the cargo box structure as shown in FIG. 5 with the difference in that the two side plates are each comprised of a fixed upper side plate and a movable lower side plate.

FIG. 6 shows another embodiment of the cargo box 1 installed on the flat bed train 12. The difference lies in that the side plates are configured in a two section structure comprising a fixed upper half side plate 13a and a pivotal lower half side plate 13b. The lower half side plate 13b is pivoted at the top end to the bottom end of the upper half side plate 13a. Thus, when the hydraulic cylinders 5 actuate the piston rods 501 to rise up, the cables 4a, 4b pull only the movable side plate 13b open for discharging articles.

Figure 7:
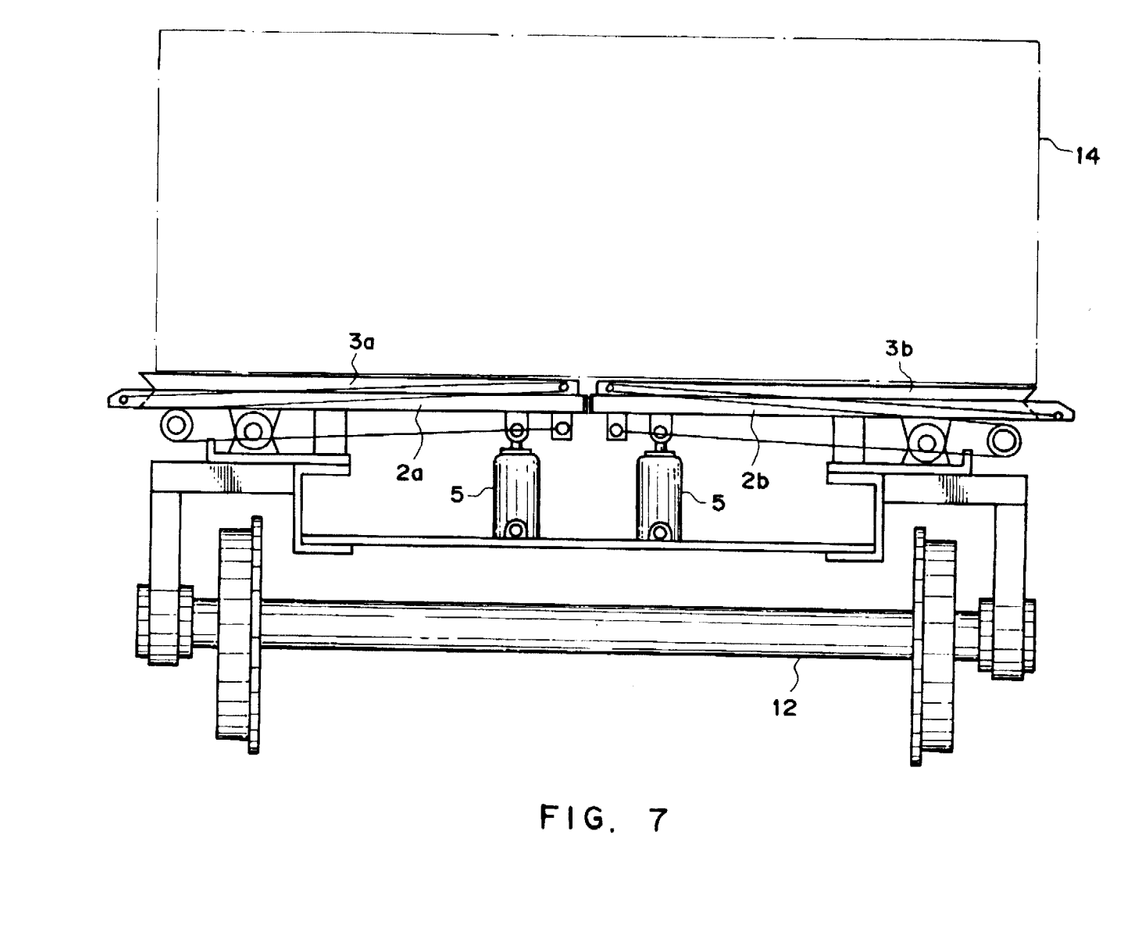
FIG. 7, as shown in FIG. 1, is a schematic cross section view showing the cargo box structure installed on a flat bed of a train with a container being carried thereon.

FIG. 7 show the cargo box 1 installed on the flat bed train 12, after the articles in the cargo box are unloaded, the left and right vertical side plates 3a, 3b can be disengaged and stacked over the bottom plates 2a, 2b. Thus, the car can be used for carrying articles such as a container 14 on its return trip. Alternatively, the disengaged side plates 3a, 3b can be placed on top of the container.

To sum up all the foregoing, with the unloading method of the present invention, unloading can be proceeded simultaneously on both sides of cargo box. Because of the short distance between the split plates, the strokes of power driving are short and the force required to drive each of the split bottom plates is cut to half such that a plurality of simple small power devices can be used to substitute power devices of particular specifications. In addition, the linkage equipments of the trains or coupled trucks can be used to apply force for unloading from a number of cargo boxes at the same time, thus greatly saving the time for unloading.

I claim:

1. An unloading mechanism for a box having split bottom plates comprising:

a pair of rectangular split bottom plates having long sides running parallel to the longitudinal axis of the box, the plates mutually abutting at one of the long sides of the plates, each of said bottom plates being pivoted about an axis parallel to the abutting side and at a distance from this abutting side;

a pair of rectangular side plates each having a free end abutting one of the bottom plates and a pivoted end, pivoted along an upper part of the side plate, which is not abutting one of the bottom plates, wherein each of the side plates has an outside face away from the bottom plates;

a pair of cables, one end of each of the cables being secured to a respective bottom plate adjacent the abutting side, the other end of each of the cables extending along the respective bottom plate to the other long side of the respective bottom plate, through a pulley, turning vertically and extending to a pulley at the pivoted end of the respective side plate, down the outside face of the side plate and secured at the free end of the side plate;

a plurality of hydraulic cylinders arranged in two rows along the abutting sides of the bottom plates with piston rods pivoted to a respective bottom plate;

wherein by extending the piston rods of the hydraulic cylinders the abutting sides of the bottom plates are lifted, rotating the bottom plates and pivoting the side plates through the cables.

2. The unloading mechanism for a box having split bottom plates according to claim 1, wherein a single row of hydraulic cylinders are provided arranged along the abutting sides of the split bottom plates, and a force dividing plate extends across the abutting sides of the split bottom plates and is secured to the piston rods, each end of the force dividing plate being formed with a projected arcuate post extending therefrom to engage a respective bottom plate.

3. The unloading mechanism for a box having split bottom plates according to claim 1, wherein the abutting sides of the split bottom plates and the free ends of the side plates are beveled into slant surfaces.

4. The unloading mechanism for a cargo box having split bottom plates according to claim 1, wherein each side plate comprises a fixed upper half side plate and a pivotal lower half side plate, the lower half side plate being pivoted at a top end thereof to a bottom end of the upper half side plate, thereby permitting the lower half side plate to be rotated.

5. The unloading mechanism for a cargo box having split bottom plates according to claim 1, wherein said pulleys are fixed on the pivoted ends of the side plates and on the bottom of the long sides of the split bottom plates for the cables to change direction.

6. The unloading mechanism for a box having split bottom plates according to claim 1, wherein resilient padding strips are secured to the mutually abutting sides of the split bottom plates.

7. The unloading mechanism for a cargo box having split bottom plates according to claim 1, wherein a longitudinal seaming strip is secured along the abutting side of one of the split bottom plates over the top surface of the abutting sides of the bottom plates.

8. The unloading mechanism for a box having split bottom plates according to claim 1, wherein locking means are installed between the free ends of the side plates and the split bottom plates, and marked with different colors to indicate locked and released positions.

9. The unloading mechanism for a box having split bottom plates according to claim 1, wherein the side plates can be disengaged from the box.

* * * * *